(12) United States Patent
Carlson et al.

(10) Patent No.: US 9,940,627 B2
(45) Date of Patent: Apr. 10, 2018

(54) MOBILE COUPON METHOD AND SYSTEM

(75) Inventors: Mark Carlson, Half Moon Bay, CA (US); Peter Ciurea, Martinez, CA (US)

(73) Assignee: Visa U.S.A. Inc., San Francisco, CA (US)

(*) Notice: Subject to any disclaimer, the term of this patent is extended or adjusted under 35 U.S.C. 154(b) by 1692 days.

(21) Appl. No.: 11/960,173

(22) Filed: Dec. 19, 2007

(65) Prior Publication Data

US 2008/0167991 A1   Jul. 10, 2008

Related U.S. Application Data

(60) Provisional application No. 60/871,898, filed on Dec. 26, 2006.

(51) Int. Cl.
  *G06Q 20/00* (2012.01)
  *G06Q 30/02* (2012.01)

(52) U.S. Cl.
  CPC .......... *G06Q 30/02* (2013.01); *G06Q 30/0215* (2013.01)

(58) Field of Classification Search
  USPC ..................................... 705/14, 64
  See application file for complete search history.

(56) References Cited

U.S. PATENT DOCUMENTS

| | | |
|---|---|---|
| 3,356,021 A | 12/1967 | May et al. |
| 4,044,231 A | 8/1977 | Beck et al. |
| 4,461,861 A | 7/1984 | Loffelman et al. |
| 4,613,904 A | 9/1986 | Lurie |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |

(Continued)

FOREIGN PATENT DOCUMENTS

| | | |
|---|---|---|
| EP | 1 096 439 A2 | 5/2001 |
| EP | 1 136 961 A1 | 9/2001 |

(Continued)

OTHER PUBLICATIONS

U.S. Appl. No. 11/749,366, Carlson.

(Continued)

*Primary Examiner* — Zeshan Qayyum
(74) *Attorney, Agent, or Firm* — Kilpatrick Townsend & Stockton LLP

(57) ABSTRACT

A system and a method for using a portable consumer device such as a mobile phone are disclosed. In one embodiment, a method according to the present invention comprises referencing data regarding an individual consumer stored as part of a payment processing network to generate an electronic coupon targeted to the individual consumer. The electronic coupon is transmitted to a mobile device of the individual consumer over a communications network, and purchase transaction utilizing the electronic coupon is processed over the payment processing network. In certain embodiments, the electronic coupon may be generated based upon temporal and/or geographic information of a prior purchase transaction conducted using the payment processing network.

27 Claims, 11 Drawing Sheets

(56) References Cited

U.S. PATENT DOCUMENTS

| | | | |
|---|---|---|---|
| 5,353,218 A | 10/1994 | DeLapa et al. | |
| 5,359,183 A | 10/1994 | Skodlar | |
| 5,388,165 A | 2/1995 | Deaton et al. | |
| RE34,915 E | 4/1995 | Nichtberger et al. | |
| 5,420,606 A | 5/1995 | Begum et al. | |
| 5,430,644 A | 7/1995 | Deaton et al. | |
| 5,448,471 A | 9/1995 | Deaton et al. | |
| 5,465,206 A | 11/1995 | Hilt et al. | |
| 5,477,038 A | 12/1995 | Levine et al. | |
| 5,483,444 A | 1/1996 | Heintzeman et al. | |
| 5,500,513 A | 3/1996 | Langhans et al. | |
| 5,502,636 A | 3/1996 | Clarke | |
| 5,530,438 A | 6/1996 | Bickham et al. | |
| 5,564,073 A | 10/1996 | Takahisa | |
| 5,577,266 A | 11/1996 | Takahisa et al. | |
| 5,579,537 A | 11/1996 | Takahisa | |
| 5,592,560 A | 1/1997 | Deaton et al. | |
| 5,604,921 A | 2/1997 | Alanara | |
| 5,615,110 A | 3/1997 | Wong | |
| 5,621,201 A | 4/1997 | Langhans et al. | |
| 5,621,812 A | 4/1997 | Deaton et al. | |
| 5,627,549 A | 5/1997 | Park | |
| 5,638,457 A | 6/1997 | Deaton et al. | |
| 5,642,485 A | 6/1997 | Dealon et al. | |
| 5,644,723 A | 7/1997 | Deaton et al. | |
| 5,649,114 A | 7/1997 | Deaton et al. | |
| 5,659,469 A | 8/1997 | Deaton et al. | |
| 5,675,662 A | 10/1997 | Deaton et al. | |
| 5,678,939 A | 10/1997 | Ross | |
| 5,687,322 A | 11/1997 | Deaton et al. | |
| 5,708,422 A | 1/1998 | Blonder et al. | |
| 5,710,886 A | 1/1998 | Christensen et al. | |
| 5,717,866 A | 2/1998 | Naftzger | |
| 5,761,648 A | 6/1998 | Golden et al. | |
| 5,777,903 A | 7/1998 | Piosenka et al. | |
| 5,791,991 A | 8/1998 | Small | |
| 5,793,972 A | 8/1998 | Shane | |
| 5,806,044 A | 9/1998 | Powell | |
| 5,822,735 A | 10/1998 | De Lapa et al. | |
| 5,855,007 A | 12/1998 | Jovicic et al. | |
| 5,870,030 A | 2/1999 | DeLuca et al. | |
| 5,884,277 A | 3/1999 | Khosla | |
| 5,905,246 A | 5/1999 | Fajkowski | |
| 5,907,830 A | 5/1999 | Engel et al. | |
| 5,924,080 A | 7/1999 | Johnson | |
| 5,959,577 A | 9/1999 | Fan et al. | |
| 5,974,399 A | 10/1999 | Giuliani et al. | |
| 5,991,749 A | 11/1999 | Morrill, Jr. | |
| 6,002,771 A * | 12/1999 | Nielsen | G06Q 20/04 380/30 |
| 6,009,411 A | 12/1999 | Kepecs | |
| 6,009,415 A | 12/1999 | Shurling et al. | |
| 6,012,038 A | 1/2000 | Powell | |
| 6,014,634 A | 1/2000 | Scroggle et al. | |
| 6,018,718 A | 1/2000 | Walker et al. | |
| 6,029,151 A | 2/2000 | Nikander | |
| 6,035,280 A | 3/2000 | Christensen | |
| 6,041,309 A | 3/2000 | Laor | |
| 6,049,778 A | 4/2000 | Walker et al. | |
| 6,055,505 A | 4/2000 | Elston | |
| 6,062,991 A | 5/2000 | Moriarty et al. | |
| 6,064,990 A | 5/2000 | Goldsmith | |
| 6,067,526 A | 5/2000 | Powell | |
| 6,067,529 A | 5/2000 | Ray et al. | |
| 6,076,068 A | 6/2000 | DeLapa et al. | |
| 6,076,069 A | 6/2000 | Laor | |
| 6,076,101 A | 6/2000 | Kamakura et al. | |
| 6,128,599 A | 10/2000 | Walker et al. | |
| 6,185,290 B1 | 2/2001 | Shaffer et al. | |
| 6,185,541 B1 | 2/2001 | Scroggie et al. | |
| 6,227,447 B1 | 5/2001 | Campisano | |
| 6,237,145 B1 | 5/2001 | Narasimhan et al. | |
| 6,247,129 B1 | 6/2001 | Keathley et al. | |
| 6,279,112 B1 | 8/2001 | O'Toole, Jr. et al. | |
| 6,292,786 B1 | 9/2001 | Deaton et al. | |
| 6,307,958 B1 | 10/2001 | Deaton et al. | |
| 6,318,631 B1 | 11/2001 | Halperin | |
| 6,321,208 B1 | 11/2001 | Barnett et al. | |
| 6,330,543 B1 | 12/2001 | Kepecs | |
| 6,330,550 B1 | 12/2001 | Brisebois et al. | |
| 6,334,108 B1 | 12/2001 | Deaton et al. | |
| 6,336,098 B1 | 1/2002 | Fortenberry et al. | |
| 6,336,099 B1 | 1/2002 | Barnett et al. | |
| 6,341,724 B2 | 1/2002 | Campisano | |
| 6,351,735 B1 | 2/2002 | Deaton et al. | |
| 6,377,935 B1 | 4/2002 | Deaton et al. | |
| 6,378,775 B2 | 4/2002 | Hayashida | |
| 6,381,324 B1 | 4/2002 | Shaffer et al. | |
| 6,424,949 B1 | 7/2002 | Deaton et al. | |
| 6,424,951 B1 | 7/2002 | Shurling et al. | |
| 6,434,534 B1 | 8/2002 | Walker et al. | |
| 6,470,181 B1 | 10/2002 | Maxwell | |
| 6,484,146 B2 | 11/2002 | Day et al. | |
| 6,488,203 B1 | 12/2002 | Stoutenburg et al. | |
| 6,505,046 B1 | 1/2003 | Baker | |
| 6,516,302 B1 | 2/2003 | Deaton et al. | |
| 6,529,725 B1 | 3/2003 | Joao et al. | |
| 6,535,855 B1 | 3/2003 | Cahill et al. | |
| 6,560,581 B1 | 5/2003 | Fox et al. | |
| 6,584,309 B1 | 6/2003 | Whigham | |
| 6,587,835 B1 | 7/2003 | Treyz et al. | |
| 6,594,376 B2 | 7/2003 | Hoffman et al. | |
| 6,601,759 B2 | 8/2003 | Fife et al. | |
| 6,609,104 B1 | 8/2003 | Deaton et al. | |
| 6,611,811 B1 | 8/2003 | Deaton et al. | |
| 6,631,849 B2 | 10/2003 | Blossom | |
| 6,647,257 B2 | 11/2003 | Owensby | |
| 6,647,269 B2 | 11/2003 | Hendrey et al. | |
| 6,664,948 B2 | 12/2003 | Crane et al. | |
| 6,684,195 B1 | 1/2004 | Deaton et al. | |
| 6,685,093 B2 | 2/2004 | Challa et al. | |
| 6,736,322 B2 | 5/2004 | Gobburu et al. | |
| 6,747,547 B2 | 6/2004 | Benson | |
| 6,749,118 B2 | 6/2004 | Kobayashi et al. | |
| 6,775,539 B2 | 8/2004 | Deshpande | |
| 6,832,721 B2 | 12/2004 | Fujii | |
| 6,837,425 B2 | 1/2005 | Gauthier et al. | |
| 6,868,391 B1 | 3/2005 | Hultgren | |
| 6,877,665 B2 | 4/2005 | Challa et al. | |
| 6,912,398 B1 | 6/2005 | Domnitz | |
| 6,920,611 B1 | 7/2005 | Spaeth et al. | |
| 6,975,852 B1 | 12/2005 | Sofer et al. | |
| 6,982,941 B2 | 1/2006 | Yamanoi et al. | |
| 6,990,330 B2 | 1/2006 | Voerepalli et al. | |
| 7,003,497 B2 | 2/2006 | Maes | |
| 7,007,840 B2 | 3/2006 | Davis | |
| 7,013,286 B1 * | 3/2006 | Aggarwal | G06Q 20/045 705/14.26 |
| 7,025,256 B1 | 4/2006 | Drummond et al. | |
| 7,028,906 B2 | 4/2006 | Challa et al. | |
| 7,039,611 B2 | 5/2006 | Devine | |
| 7,040,533 B1 | 5/2006 | Ramachandran | |
| 7,051,923 B2 | 5/2006 | Nguyen et al. | |
| 7,055,031 B2 | 5/2006 | Platt | |
| 7,069,001 B2 * | 6/2006 | Rupp | G06Q 20/04 380/247 |
| 7,076,329 B1 | 7/2006 | Kolls | |
| 7,089,208 B1 | 8/2006 | Levchin et al. | |
| 7,099,850 B1 | 8/2006 | Mann et al. | |
| 7,104,446 B2 | 9/2006 | Bortolin et al. | |
| 7,107,250 B2 | 9/2006 | Harrison | |
| 7,110,954 B2 | 9/2006 | Yung et al. | |
| 7,121,456 B2 | 10/2006 | Spaeth et al. | |
| 7,124,937 B2 | 10/2006 | Myers et al. | |
| 7,150,393 B1 | 12/2006 | Drummond et al. | |
| 7,152,780 B2 | 12/2006 | Gauthier et al. | |
| 7,159,770 B2 | 1/2007 | Onozu et al. | |
| 7,194,437 B1 | 3/2007 | Britto et al. | |
| 7,201,313 B1 | 4/2007 | Ramachandran | |
| 7,203,300 B2 | 4/2007 | Shaffer et al. | |
| 7,207,477 B1 | 4/2007 | Ramachandran | |
| 7,213,755 B2 | 5/2007 | Newsome et al. | |
| 7,231,357 B1 * | 6/2007 | Shanman | G06Q 20/387 705/14.23 |

(56) References Cited

U.S. PATENT DOCUMENTS

| | | | |
|---|---|---|---|
| 7,231,372 | B1 | 6/2007 | Prange et al. |
| RE39,736 | E | 7/2007 | Morrill, Jr. |
| 7,243,853 | B1 | 7/2007 | Levy et al. |
| 7,257,545 | B1 | 8/2007 | Hung |
| 7,280,981 | B2 | 10/2007 | Huang et al. |
| 7,290,704 | B1 | 11/2007 | Ball et al. |
| 7,308,254 | B1 | 12/2007 | Rissanen |
| 7,343,149 | B2 | 3/2008 | Benco et al. |
| 7,350,702 | B2 | 4/2008 | Bortolin et al. |
| 7,353,187 | B1* | 4/2008 | Emodi ............... G06Q 30/02 705/26.1 |
| 7,356,516 | B2 | 4/2008 | Richey et al. |
| 7,357,310 | B2 | 4/2008 | Calabrese et al. |
| 7,407,094 | B2 | 8/2008 | Myers et al. |
| 7,440,771 | B2 | 10/2008 | Purk |
| 7,447,662 | B2* | 11/2008 | Gibson ............... G06Q 20/04 705/64 |
| 7,464,867 | B1 | 12/2008 | Kolls |
| 7,653,599 | B2 | 1/2010 | Doran et al. |
| 7,953,630 | B2* | 5/2011 | Fowler et al. ............... 705/14.3 |
| 2001/0013542 | A1 | 8/2001 | Horowitz et al. |
| 2002/0013711 | A1 | 1/2002 | Ahuja et al. |
| 2002/0062249 | A1 | 5/2002 | Iannaci et al. |
| 2002/0065713 | A1 | 5/2002 | Awada et al. |
| 2002/0091569 | A1* | 7/2002 | Kitaura ............... G06Q 30/02 705/14.26 |
| 2002/0128903 | A1 | 9/2002 | Kernahan |
| 2002/0161701 | A1 | 10/2002 | Warmack |
| 2002/0165775 | A1 | 11/2002 | Tagseth et al. |
| 2002/0169719 | A1 | 11/2002 | Dively et al. |
| 2002/0190118 | A1* | 12/2002 | Davenport ............ G06Q 20/341 235/375 |
| 2002/0198777 | A1 | 12/2002 | Yuasa |
| 2003/0004808 | A1* | 1/2003 | Elhaoussine ......... G06Q 20/045 705/14.27 |
| 2003/0058261 | A1 | 3/2003 | Challa et al. |
| 2003/0120593 | A1 | 6/2003 | Bansal et al. |
| 2003/0126078 | A1 | 7/2003 | Vihinen |
| 2003/0144907 | A1 | 7/2003 | Cohen et al. |
| 2003/0172040 | A1 | 9/2003 | Kemper et al. |
| 2003/0208406 | A1 | 11/2003 | Okamoto et al. |
| 2003/0212595 | A1 | 11/2003 | Antonucci |
| 2003/0212642 | A1 | 11/2003 | Weller et al. |
| 2003/0225618 | A1 | 12/2003 | Hessburg et al. |
| 2003/0230630 | A1 | 12/2003 | Whipple et al. |
| 2003/0233292 | A1 | 12/2003 | Richey et al. |
| 2004/0019522 | A1 | 1/2004 | Bortolin et al. |
| 2004/0030607 | A1 | 2/2004 | Gibson |
| 2004/0044621 | A1 | 3/2004 | Huang et al. |
| 2004/0049455 | A1 | 3/2004 | Mohsenzadeh |
| 2004/0050922 | A1 | 3/2004 | Gauthier et al. |
| 2004/0054575 | A1 | 3/2004 | Marshall |
| 2004/0054581 | A1 | 3/2004 | Redford et al. |
| 2004/0054590 | A1 | 3/2004 | Redford et al. |
| 2004/0054591 | A1 | 3/2004 | Spaeth et al. |
| 2004/0064406 | A1 | 4/2004 | Yates et al. |
| 2004/0117254 | A1 | 6/2004 | Nemirofsky et al. |
| 2004/0133653 | A1 | 7/2004 | Defosse et al. |
| 2004/0139021 | A1 | 7/2004 | Reed et al. |
| 2004/0148224 | A1 | 7/2004 | Gauthier et al. |
| 2004/0153715 | A1 | 8/2004 | Spaeth et al. |
| 2004/0158534 | A1 | 8/2004 | Azami et al. |
| 2004/0199470 | A1 | 10/2004 | Ferry, Jr. et al. |
| 2004/0220964 | A1 | 11/2004 | Shiftan et al. |
| 2004/0243519 | A1* | 12/2004 | Perttila ............... G06Q 20/20 705/75 |
| 2004/0254848 | A1 | 12/2004 | Golan et al. |
| 2004/0260653 | A1 | 12/2004 | Tsuei et al. |
| 2005/0021456 | A1 | 1/2005 | Steele et al. |
| 2005/0029344 | A1 | 2/2005 | Davis |
| 2005/0035847 | A1 | 2/2005 | Bonalle et al. |
| 2005/0036611 | A1 | 2/2005 | Seaton, Jr. et al. |
| 2005/0045718 | A1 | 3/2005 | Bortolin et al. |
| 2005/0055270 | A1* | 3/2005 | Broe ............... G06Q 20/20 705/14.38 |
| 2005/0058427 | A1 | 3/2005 | Nguyen et al. |
| 2005/0071225 | A1 | 3/2005 | Bortolin et al. |
| 2005/0071226 | A1 | 3/2005 | Nguyen et al. |
| 2005/0071227 | A1 | 3/2005 | Hammad et al. |
| 2005/0071228 | A1 | 3/2005 | Bortolin et al. |
| 2005/0071235 | A1 | 3/2005 | Nguyen et al. |
| 2005/0075958 | A1 | 4/2005 | Gonzalez |
| 2005/0097473 | A1 | 5/2005 | Malik et al. |
| 2005/0102233 | A1 | 5/2005 | Park et al. |
| 2005/0102234 | A1 | 5/2005 | Devine |
| 2005/0121506 | A1 | 6/2005 | Gauthier et al. |
| 2005/0149455 | A1 | 7/2005 | Bruesewitz et al. |
| 2005/0177510 | A1 | 8/2005 | Hilt et al. |
| 2005/0199714 | A1 | 9/2005 | Brandt et al. |
| 2005/0210387 | A1 | 9/2005 | Alagappan et al. |
| 2005/0219061 | A1 | 10/2005 | Lai et al. |
| 2005/0222933 | A1 | 10/2005 | Wesby |
| 2005/0283416 | A1 | 12/2005 | Reid et al. |
| 2005/0283430 | A1 | 12/2005 | Reid et al. |
| 2005/0283431 | A1 | 12/2005 | Reid et al. |
| 2005/0283432 | A1 | 12/2005 | Reid et al. |
| 2005/0283433 | A1 | 12/2005 | Reid et al. |
| 2006/0053056 | A1 | 3/2006 | Alspach-Goss et al. |
| 2006/0059110 | A1 | 3/2006 | Madhok et al. |
| 2006/0080243 | A1 | 4/2006 | Kemper et al. |
| 2006/0085260 | A1 | 4/2006 | Yamagishi |
| 2006/0111967 | A1 | 5/2006 | Forbes |
| 2006/0122881 | A1 | 6/2006 | Walker et al. |
| 2006/0149529 | A1 | 7/2006 | Nguyen et al. |
| 2006/0155644 | A1 | 7/2006 | Reid et al. |
| 2006/0163345 | A1 | 7/2006 | Myers et al. |
| 2006/0175403 | A1* | 8/2006 | Fossen McConnell ............ G06Q 30/02 235/385 |
| 2006/0178957 | A1 | 8/2006 | LeClaire |
| 2006/0179007 | A1 | 8/2006 | Davis |
| 2006/0202025 | A1 | 9/2006 | Calabrese et al. |
| 2006/0206376 | A1 | 9/2006 | Gibbs et al. |
| 2006/0218086 | A1 | 9/2006 | Campbell et al. |
| 2006/0224449 | A1 | 10/2006 | Byerley et al. |
| 2006/0248007 | A1 | 11/2006 | Hofer et al. |
| 2006/0253390 | A1 | 11/2006 | McCarthy et al. |
| 2006/0270421 | A1* | 11/2006 | Phillips ............... G08B 21/0236 455/457 |
| 2006/0282382 | A1 | 12/2006 | Balasubramanian et al. |
| 2006/0290501 | A1 | 12/2006 | Hammad et al. |
| 2006/0293027 | A1 | 12/2006 | Hammad et al. |
| 2007/0001000 | A1 | 1/2007 | Nguyen et al. |
| 2007/0001001 | A1 | 1/2007 | Myers et al. |
| 2007/0005613 | A1 | 1/2007 | Singh et al. |
| 2007/0005774 | A1 | 1/2007 | Singh et al. |
| 2007/0012764 | A1 | 1/2007 | Bortolin et al. |
| 2007/0017970 | A1 | 1/2007 | Gauthier et al. |
| 2007/0027803 | A1 | 2/2007 | Brandes et al. |
| 2007/0034679 | A1 | 2/2007 | Gauthier et al. |
| 2007/0055597 | A1 | 3/2007 | Patel et al. |
| 2007/0055630 | A1 | 3/2007 | Gauthier et al. |
| 2007/0057034 | A1 | 3/2007 | Gauthier et al. |
| 2007/0057051 | A1 | 3/2007 | Bortolin et al. |
| 2007/0083465 | A1 | 4/2007 | Ciurea et al. |
| 2007/0100691 | A1 | 5/2007 | Patterson |
| 2007/0125842 | A1 | 6/2007 | Antoo et al. |
| 2007/0194104 | A1 | 8/2007 | Fukada |
| 2007/0203836 | A1 | 8/2007 | Dodin |
| 2007/0205270 | A1 | 9/2007 | Kemper et al. |
| 2007/0241189 | A1 | 10/2007 | Slavin et al. |
| 2007/0244811 | A1 | 10/2007 | Tumminaro |
| 2007/0250380 | A1* | 10/2007 | Mankoff ............ G06F 17/30011 705/14.23 |
| 2007/0276764 | A1 | 11/2007 | Mann |
| 2007/0288373 | A1 | 12/2007 | Wilkes |
| 2008/0003987 | A1* | 1/2008 | Mechaley ............ G06Q 20/20 455/414.3 |
| 2008/0006685 | A1 | 1/2008 | Rackley, III et al. |
| 2008/0021784 | A1 | 1/2008 | Hessburg et al. |
| 2008/0040265 | A1 | 2/2008 | Rackley, III et al. |

(56) References Cited

U.S. PATENT DOCUMENTS

| | | | |
|---|---|---|---|
| 2008/0114657 A1* | 5/2008 | Forzley | G06Q 20/00 705/14.23 |
| 2008/0120182 A1 | 5/2008 | Arnold et al. | |
| 2008/0133366 A1 | 6/2008 | Carlson | |
| 2008/0154727 A1 | 6/2008 | Carlson et al. | |
| 2008/0154735 A1 | 6/2008 | Carlson | |
| 2008/0154772 A1 | 6/2008 | Carlson | |
| 2008/0163257 A1 | 7/2008 | Carlson | |
| 2008/0167991 A1 | 7/2008 | Carlson et al. | |
| 2008/0183480 A1 | 7/2008 | Carslon | |
| 2008/0201226 A1 | 8/2008 | Carlson et al. | |
| 2008/0208762 A1 | 8/2008 | Arthur et al. | |
| 2008/0300973 A1 | 12/2008 | DeWitt et al. | |
| 2008/0319843 A1 | 12/2008 | Moser et al. | |
| 2009/0076896 A1 | 3/2009 | DeWitt et al. | |
| 2009/0076925 A1 | 3/2009 | DeWitt et al. | |
| 2009/0078777 A1 | 3/2009 | Granucci et al. | |
| 2009/0081990 A1 | 3/2009 | Granucci et al. | |
| 2009/0112721 A1 | 4/2009 | Hammad et al. | |
| 2009/0119170 A1 | 5/2009 | Hammad et al. | |
| 2009/0182634 A1 | 7/2009 | Park et al. | |
| 2009/0134840 A1 | 12/2009 | Granucci et al. | |

FOREIGN PATENT DOCUMENTS

| | | |
|---|---|---|
| GB | 2 348 781 B | 11/2003 |
| WO | WO 96/13814 A1 | 5/1996 |
| WO | WO 97/45814 A1 | 12/1997 |
| WO | WO 1999/051038 | 7/1999 |
| WO | WO 2000/003328 | 1/2000 |
| WO | WO 00/77697 A1 | 12/2000 |
| WO | WO 2004/077369 A1 | 9/2004 |
| WO | WO 2005/052869 A1 | 6/2005 |
| WO | WO 2006/024080 A1 | 3/2006 |

OTHER PUBLICATIONS

U.S. Appl. No. 11/767,033, Carlson, et al.
U.S. Appl. No. 11/960,162, Carlson, et al.
U.S. Appl. No. 11/963,736, Carlson, et al.
U.S. Appl. No. 11/963,095, Carlson, et al.
U.S. Appl. No. 11/962,836, Carlson, et al.
About Us, 1 page downloaded from http://www.cellfire.com/about-us/ on May 10, 2007, 1 page.
bCode™ is the future of Mobile Coupon, Ticketing, Loyalty and Payments, 2 page product brochure downloaded from http://www.bcode.com on May 11, 2007, 2 pages.
bCode™ MediaHub 200 Mobile Coupon, Ticketing, Loyalty and Payments, 2 page product brochure, from http://www.bcode.com/news_media.htm on May 11, 2007 , 2 pages.
Cellfire—Mobile coupons for your cell phone, 1 page product brochure downloaded from http://www.cellfire.com on May 11, 2007, 1 page.
Cellfire, Coupons on Cellfire, 2 pages downloaded from http://www.cellfire.com/coupons on May 10, 2007, 2 pages.
Press Release, "Three months after California release, Cellfire™ reports redemption rates n times greater than paper coupons," issued by Cellfire, Inc. Mar. 22, 2006; pp. 1-2 downloaded from http://www.cellfire.com/about-us/articles/2006-03-22_redemption-rate, 2 pages.
Purdy et al., "When Mobile Coupons Replace Paper Coupons, Everyone Wins," pp. 1-17 published by Frost & Sullivan.[online]. info.cellfire.com, May 11, 2007, [Retrieved from the Internet: URL: http://info.cellfire.com/cellfire/themes/cellfire/downloads/When_Mobile_Coupons_Replace_Paper_Coupons.pdf], 17 pages.
U.S. Appl. No. 11/960,162, filed Dec. 19, 2007.
U.S. Appl. No. 12/491,143, filed Jun. 24, 2009.
U.S. Appl. No. 12/491,125, filed Jun. 24, 2009.
U.S. Appl. No. 12/491,139, filed Jun. 24, 2009.
International Preliminary Report on Patentability from International Application No. PCT/US2007/088687 dated Jun. 30, 2009.
"SmarTrip More Than a Smart Card. It's Pure Genius", 1998-2004, WMATA, http://www.wmata.com/riding/smartrip.cfm (2 pages).
"Adding value to SmarTrip is as easy as using it", 1998-2004, WMATA, http://www.wmata.com/riding/smartrip_adding_value.cfm (1 page).
"Virtual Shopping: Straight Goods on Cyber-stores and Security." Chatelaine; vol. 70, p. 24 (Feb. 1997).
International Search Report from International Application No. PCT/US2008/076761 dated Dec. 16, 2008.
International Search Report from International Application No. PCT/US2008/077688 dated Dec. 2, 2008.
International Preliminary Report on Patentability from International Application No. PCT/US2007/088289 dated Jun. 30, 2009.
International Preliminary Report on Patentability from International Application No. PCT/US2007/088313 dated Jun. 30, 2009.
International Preliminary Report on Patentability from International Application No. PCT/US2007/088653 dated Jun. 30, 2009.
International Preliminary Report on Patentability from International Application No. PCT/US2007/088659 dated Jun. 30, 2009.
Emmerson, Kassidy; "The History of PayPal: One of the Most Successful Online Money Transmitters Today"; 2009, http://www.associatedcontent.com/pop_print.shtml?content_type=arti . . . , 1 page.
Kageyama, Yuri; "Japanese carrier unveils mobile-phone wallet"; http://usatoday.printthis.clickability.com/pt/cpt?action=cpt&title=USATODAY.com+-+Jap . . . , 3 pages.
Korousic, Bojan et al.; "3rd Year Project Report EZ-Ca$h: Feasibility Project"; 2003, *Electronics Engineering Technology-Telecommunications Systems, Conestoga College*, 33 pages.
Subramanian, Hemang C.; "SIM Access Profile: Electronic currency using SIM Access Profile"; 2003, http:/www-128.ibm.com/developerworks/wireless/library/wi-simacc/, 6 pages.
"Ubiquitous Commerce"; http://www.accenture.com/Global/Services/Accenture_Technology_Labs/R_and_I/Mobile . . . , 2 pages.
"M Pay: Frequently Asked Questions"; http://www.m-pay.com/index.php?id=18, 5 pages.
"GSMVend Technical Manual"; http://www.bonusdata.net/IntusJunior/GSMVend/gsmvend.htm, 14 pages.
Non-Final office Action, dated Sep. 18, 2017, in U.S. Appl. No. 11/960,162, 11 pages.

* cited by examiner

MOBILE COUPON METHOD AND SYSTEM

CROSS-REFERENCE TO RELATED APPLICATION

The instant nonprovisional patent application claims priority to U.S. Provisional Patent Application No. 60/871,898, filed Dec. 26, 2006 and incorporated by reference in its entirety herein for all purposes.

BACKGROUND

Coupons are a useful marketing tool to enhance brand loyalty and introduce new products. By allowing customization of the effective duration and value of an offer, a coupon provides a flexible incentive for a consumer to purchase a particular product or line of products.

Conventionally, coupons have been available in printed form from sources such as newspapers. Increased adoption of electronic sources of information such as the world-wide-web, however, has led to the increase in popularity of electronic coupons.

In addition, most consumers now own and operate a cell phone or other portable electronic device. This renders such consumers accessible to the distribution of electronic coupons as they do their shopping, and moreover allows such distributed electronic coupons to be redeemed directly at the store location.

Accordingly, there is a need in the art for methods and systems allowing for the distribution and use of electronic coupons by mobile electronic devices.

BRIEF SUMMARY

A system and a method for using a portable consumer device such as a mobile phone are disclosed. In one embodiment, a method according to the present invention comprises referencing data regarding an individual consumer stored as part of a payment processing network to generate an electronic coupon targeted to the individual consumer. The electronic coupon is transmitted to a mobile device of the individual consumer over a communications network, and purchase transaction utilizing the electronic coupon is processed over the payment processing network. In certain embodiments, the electronic coupon may be generated based upon temporal and/or geographic information of a prior purchase transaction conducted using the payment processing network.

These and other embodiments of the invention are described in further detail below.

DETAILED DESCRIPTION

I. Payment Processing Systems

Embodiments of the invention are directed to the use of portable consumer devices, and methods and systems employing them. Preferred portable consumer devices are mobile phones. The mobile phones can be used in payment processing systems like those shown in FIG. 1.

Figure 1:
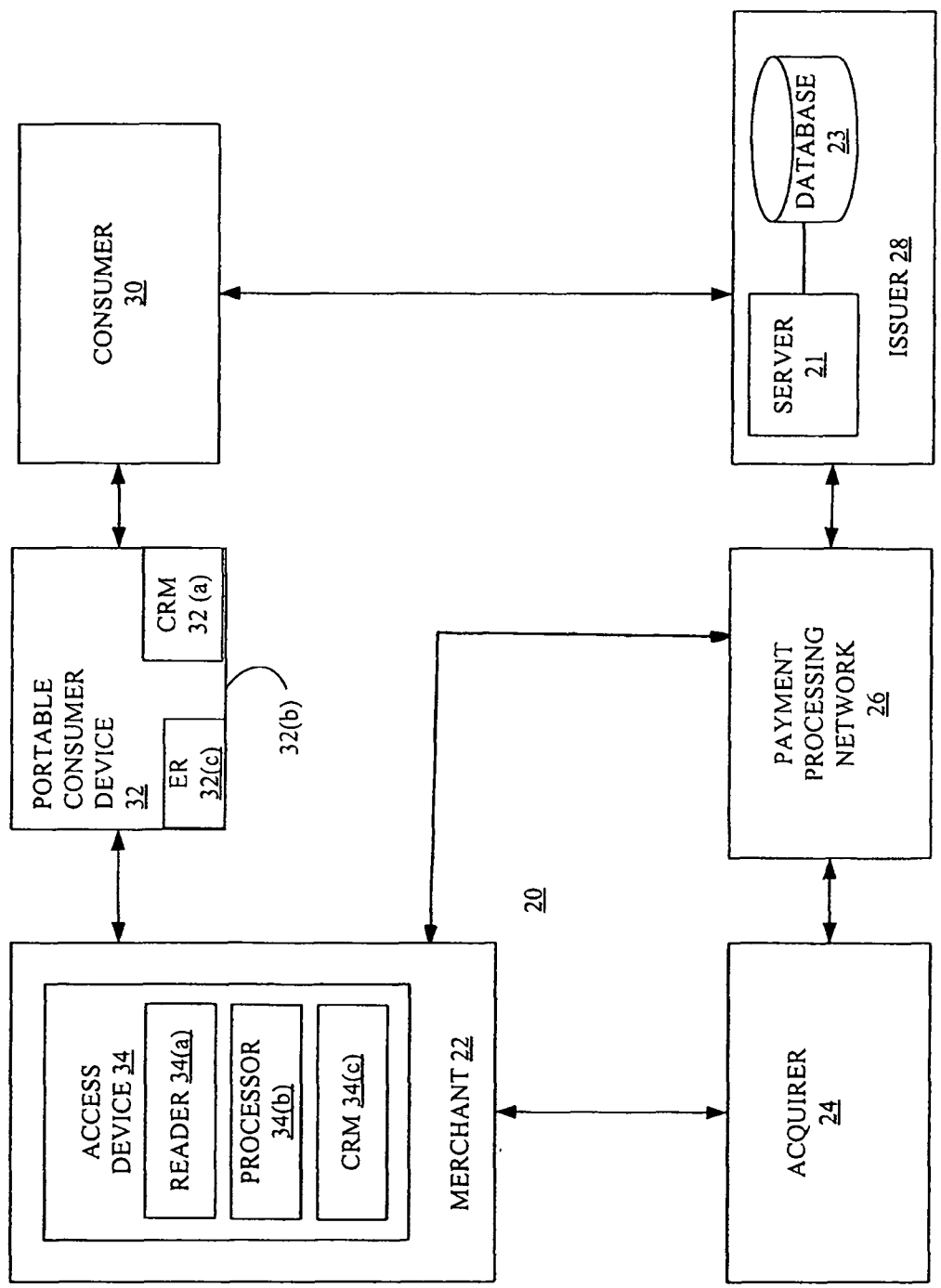
FIG. 1 shows a simplified block diagram of a payment processing system.

FIG. 1 shows a system 20 that can be used in an embodiment of the invention. The system 20 includes a merchant 22 and an acquirer 24 associated with the merchant 22. In a typical payment transaction, a consumer 30 may purchase goods or services at the merchant 22 using a portable consumer device 32. The acquirer 24 can communicate with an issuer 28 via a payment processing system 26.

The acquirer 24 is typically a bank that has a merchant account. The issuer 28 may also be a bank, but could also be business entity such as a retail store. Some entities are both acquirers and issuers, and embodiments of the invention include such entities. The issuer 28 may operate a server computer 21, which may have a computer readable medium comprising code for performing the functions that the issuer 28 performs. A database 23 comprising account number information and other information may be operatively coupled to the server computer 21.

The consumer 30 may be an individual, or an organization such as a business that is capable of purchasing goods or services.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The portable consumer device 32 may comprise a computer readable medium 32(a) and a body 32(b). The computer readable medium 32(a) may be on the body 32(b). The body 32(b) may in the form a plastic substrate, housing, or other structure. The computer readable medium 32(a) may be a memory that stores data and may be in any suitable form. Exemplary computer readable media 32(a) may be in any suitable form including a magnetic stripe, a memory chip, etc. If the portable consumer device 32 is in the form of a card, it may have an embossed region 32(a) which is embossed with a PAN (primary account number).

Figure 1A:
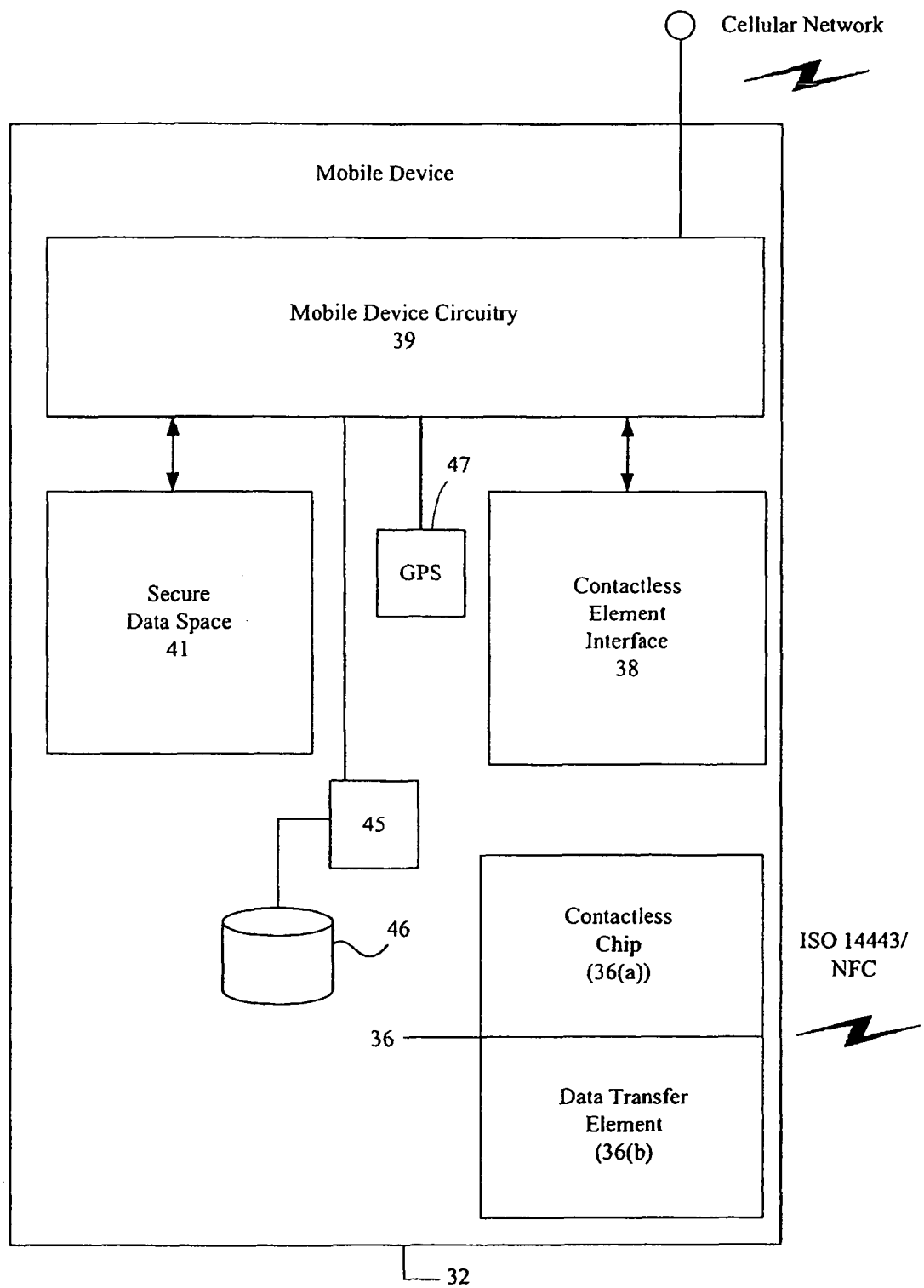
FIG. 1A shows a block diagram of a portable consumer device for use with the payment processing system of FIG. 1.

FIG. 1A shows an enlarged view of the portable (mobile) device. Device 32 further includes a contactless element 36, typically implemented in the form of a semiconductor chip

36(*a*) (or other data storage element) with an associated wireless data transfer (e.g., data transmission) element 36(*b*), such as an antenna. Contactless element 36 is associated with (e.g., embedded within) mobile device 32 and data such as a coupon or control instructions transmitted via cellular network may be applied to contactless element 36 by means of contactless element interface 38. Contactless element interface 38 functions to permit the exchange of data and/or control instructions between the mobile device circuitry 39 (and hence the cellular network) and contactless element 36.

Mobile device 32 may also include a secure data space 41, which may be used by the device to store operating parameters and/or other data utilized in operation of the device. The secure data space 41 may be in the form of a chip that is separate and apart from the chip in the contactless element 36, or alternatively, could be a section of memory in the chip that forms part of the contactless element 36. Note that the chip in the contactless element 36 may include data storage capability in the form of a memory that may be accessed via interface 38 to permit the implementation of read, write, and erase functions, for example.

In accordance with still other embodiments, the mobile device may further include a processor 45 and computer readable storage medium 46 for storing code and configured to direct the processor to perform various tasks. For example, the computer readable storage medium may comprise a magnetic disk drive or a flash memory chip.

As discussed below, the computer readable storage medium may contain code that is configured to cause a processor of the portable consumer device to receive and recognize a message including a coupon and code that is delivered to the mobile device. The computer readable storage medium may also include code that is configured to decrypt an encrypted message including the code that is received by the mobile device.

Contactless element 36 is capable of transferring and receiving data using a near field communications capability (or near field communications medium) typically in accordance with a standardized protocol or data transfer mechanism (identified as ISO 14443/NFC in the figure). Near field communications capability is a short-range communications capability, such as RFID, Bluetooth™, infra-red, or other data transfer capability that can be used to exchange data between the mobile device 32 and a local apparatus, for example located a point-of-sale of a merchant or another location at which coupons are expected to be redeemed. Thus, mobile device 32 is capable of communicating and transferring data and/or control instructions via both cellular network and near field communications capability.

In accordance with certain embodiments, the mobile device further includes a Global Positioning System (GPS) element 47. GPS element 47 is configured to allow determination of the location of the user at any time. In particular, GPS element 47 relies upon signals from a plurality of orbiting satellites in order to allow the user's location to be determined. Location information obtained from the GPS element 47 may in turn be communicated through the antenna to allow monitoring of the user's position.

Returning to FIG. 1, the payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. In embodiment of a system of FIG. 1, the access device 34 is located at the merchant 22. However, it could be located at any other suitable location in other embodiments of the invention.

The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may include a reader 34(*a*), a processor 34(*b*) and a computer readable medium 34(*c*). The reader 34(*b*) may include any suitable contact or contactless mode of operation. For example, exemplary card readers can include RF (radio frequency) antennas, magnetic stripe readers, etc. to interact with the portable consumer device 32.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may take a credit card and may swipe it through an appropriate slot in the POS terminal.

Alternatively, the POS terminal may be a contactless reader, and the portable consumer device 32 may be a contactless device such as a contactless card. In certain embodiments, the portable consumer device may be a mobile device such as shown in FIG. 1A above. As described in detail below, the antenna of the mobile device may be utilized to communicate not only payment information to the POS, but also may also communicate information (such as a code) from a mobile coupon to a POS device.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 to indicate whether or not the current transaction is authorized (or not authorized). The transaction processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the transaction processing network 26. A clearing process is a process of exchanging financial details between and acquirer and an issuer to facilitate posting to a consumer's account and reconciliation of the consumer's settlement position.

Some of the embodiments described below may use a payment processing system like the one described above, or any suitable combination of components in the payment processing system.

II. Mobile Coupon Method and System

Particular embodiments in accordance with the present invention relate to methods and apparatuses which allow distribution and/or redemption of electronic coupons at a mobile personal device. Various embodiments of such a system are described in the following figures.

Figure 2:
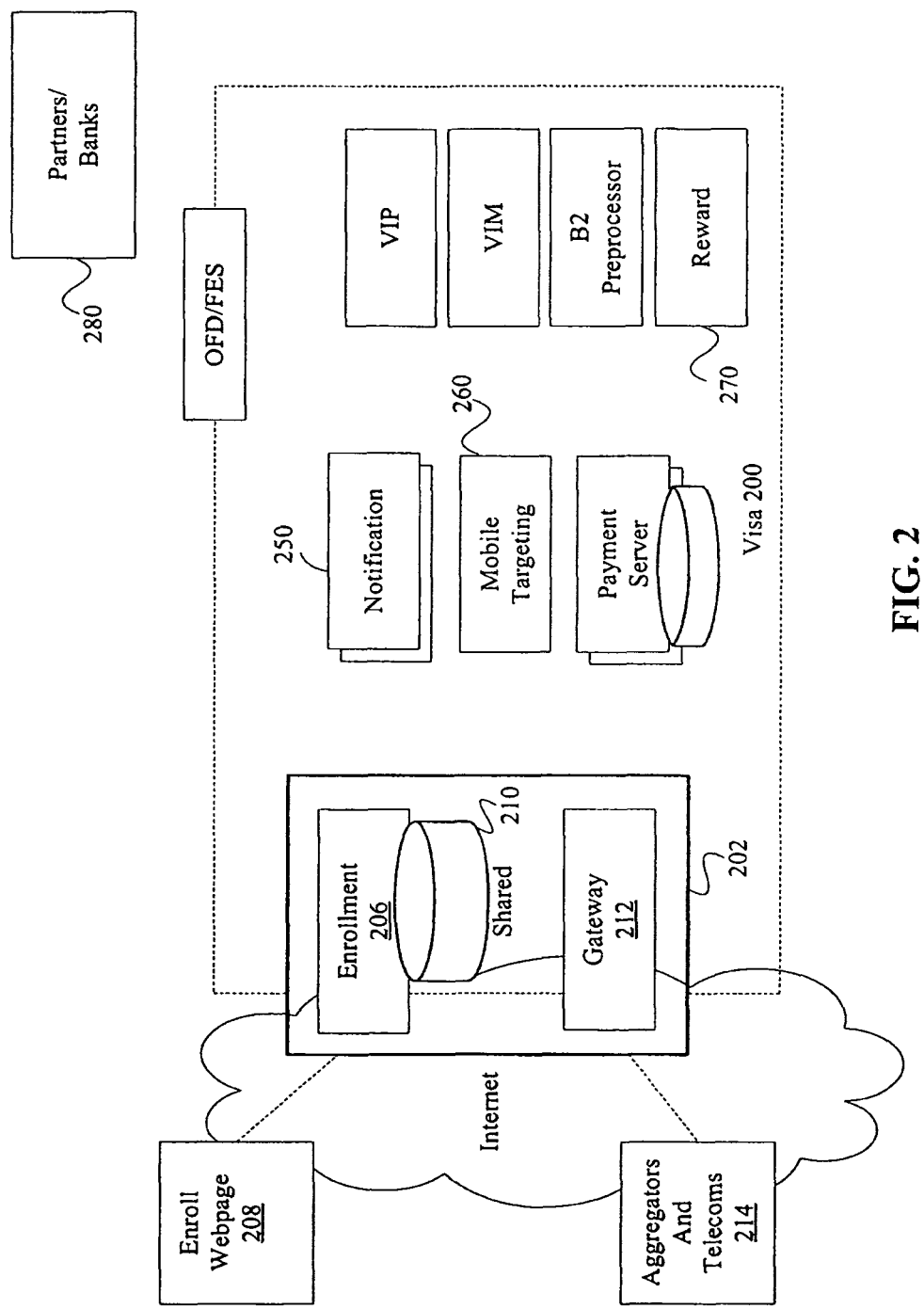
FIG. 2 shows a simplified block diagram of an embodiment of a system for implementing a mobile coupon program in accordance with an embodiment of the present invention.

FIG. 2 shows an overall view of an embodiment of a system in accordance with the present invention for administering a mobile coupon program. A first entity 200 (i.e. Visa) is responsible for operating a payment processing network. Under the control of entity 200 are a number of different operational elements.

For example, mobile campaign server 202 functions as the interface between entity 200 and the outside world, here represented by the internet "cloud" 204. Mobile campaign server 202 can include at least three components.

Specifically, mobile enrollment server 206 provides a browser interface for potential users to enroll in the mobile coupon program using an enrollment webpage 208. Mobile enrollment server 206 is configured to receive from potential users certain pieces of information allowing their participation in the program. For example, in an enrollment form supplied electronically to server 206, the prospective participant can provide information such as the telephone number of their portable device, a security password, and preferences regarding the types of mobile coupons that they wish to receive.

Figure 3:
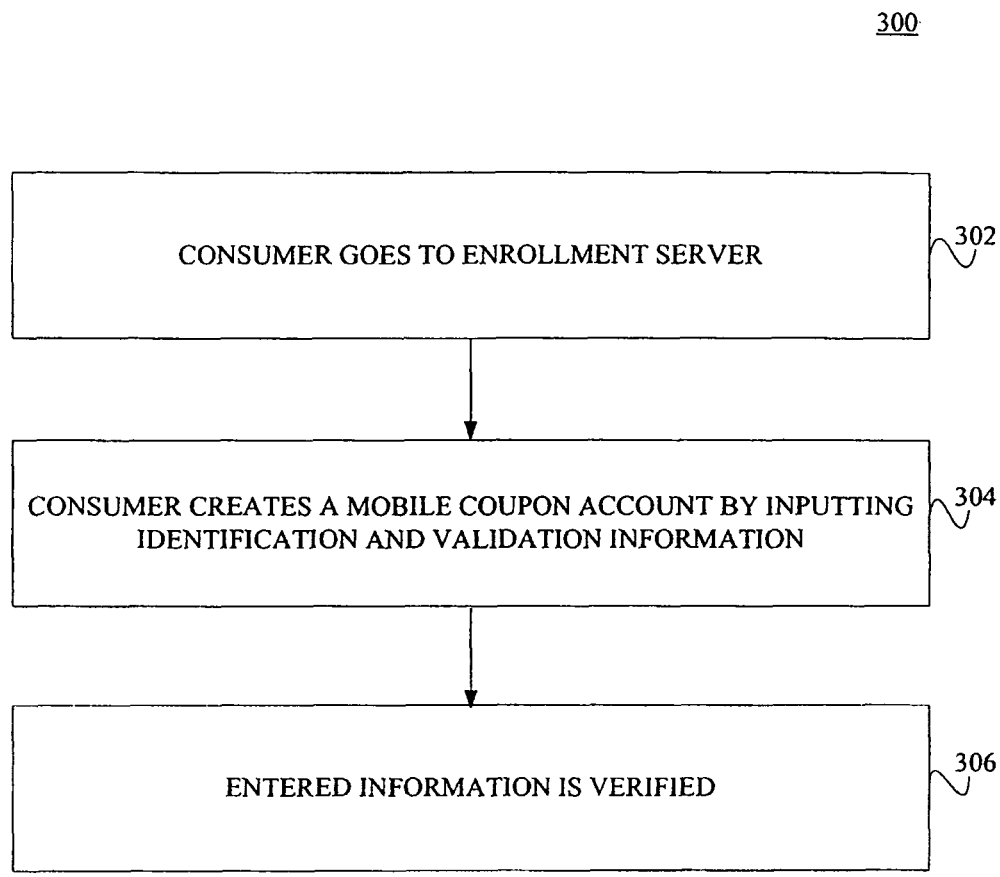
FIG. 3 shows a simplified flow diagram of a process for enrolling in a mobile coupon program according to an embodiment of the present invention.

FIG. 3 provides a simplified flow chart of the steps for enrolling in a mobile coupon program. In step 302 of enrollment flow 300, a consumer navigates to the website of the enrollment server utilizing his or her browser.

In the next step 304, the consumer creates a mobile coupon account by inputting identification and validation information. Examples of such identification information include the user's name, the telephone number of the user's mobile electronic device, financial account numbers, and optional aliases. At this stage, the consumer also verifies that they have read appropriate disclaimers and affirmatively indicate that they seek to opt-into the mobile coupon program.

In step 306 of enrollment flow 300, information entered by the consumer is verified. Examples of such verification include confirming that the consumer identified is actually in possession of the portable device, that the portable device belongs to the consumer, and that any identified account belongs to the consumer.

Returning to FIG. 2, mobile enrollment server 206 is in turn in electronic communication with user database 210. Database 210 includes data relating to the user of the mobile coupon system, including the specific information provided during enrollment. Access to the contents of database 210 is shared with gateway server 212.

Gateway server 212 serves as the interface with outside entities responsible for implementing the mobile coupon program. For example, telecommunications companies ("telecoms") 214 provide the infrastructure necessary to communicate the coupon to the user's mobile device wherever they happen to be. The telecom entities must provide sufficient capacity to handle a sufficiently high volume of coupon messages outgoing to recipients.

Where such volume of messages is expected to be small (for example at the inception of the mobile coupon program), another type of company called an aggregator will secure sufficient bandwidth for all of the expected messages from the telecom, and then aggregate the messages from different sources.

In an exemplary embodiment, a coupon is sent to a user's phone or other portable device. The coupon may be sent in any one of a number of different forms, including but not limited to an short messaging service (SMS) message, a SMS link, a multimedia messaging service (MMS) message, or e-mail message.

The coupon may be communicated utilizing any one of several types of communications systems. For example, the coupon may be communicated to the cell phone utilizing SMS. Such an embodiment offers a number of possible advantages, including broad access as SMS is available on almost every cell phone. Possible disadvantages to mobile coupon distribution utilizing SMS is a weak mechanism for confirming receipt of the coupon by the designated recipient, and also a high transaction cost as charges are typically incurred for each SMS message transmitted.

In accordance with alternative embodiments, the mobile coupon could be distributed by a Global System for Mobile Communications (GSM) system. Such GSM communication are cheap and secure, and would support confirmation of receipt of the coupon by a designated user.

Further alternatively, the coupons could be distributed utilizing a Near Field Communications (NFC) system. Such an embodiment would require the portable consumer device to be equipped with an NFC chip and programmed with a software application. The source of the near field signal providing the electronic coupon could be local kiosks, for example as present in a shopping mall. An alternative source of electronic coupons available utilizing such near field communication is the point of sale itself. Other sources are possible.

The coupon may be communicated to the portable consumer device in encrypted form. Such encryption would prevent interception and unauthorized use of a coupon by other than the intended recipient. A processor present in the portable consumer device could in turn decrypt the message upon its receipt.

Figure 4:
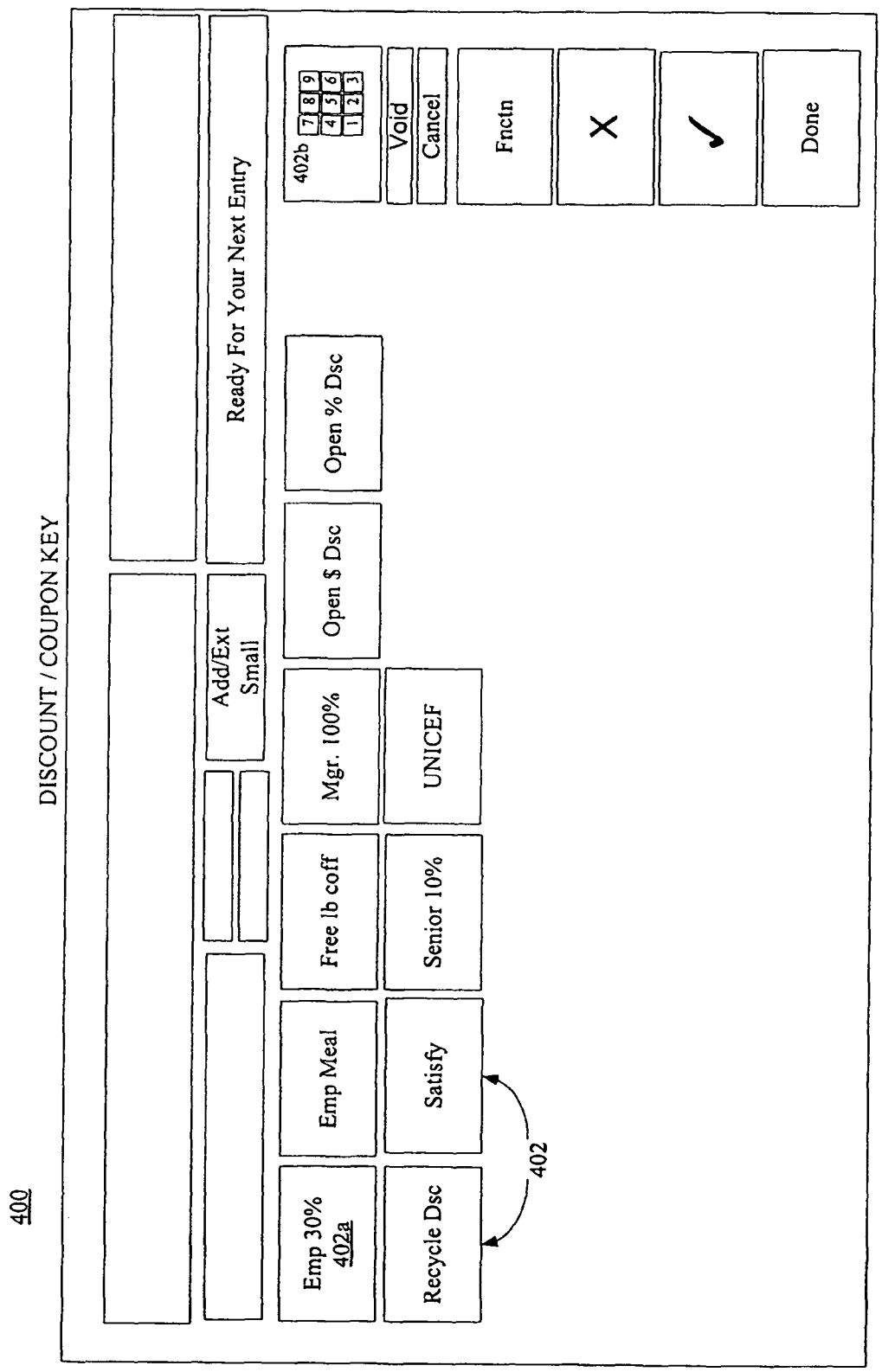
FIG. 4 shows a screen from a POS terminal.

FIG. 4 shows a screen 400 from a POS terminal. The screen 400 shows buttons 402 that a cashier might select in order to initiate a pre-arranged discount utilizing an electronic coupon. For example, button 402a allows the cashier to implement a 30% discount for employees etc. Button 402b allows the cashier to manually enter a number for numeric look-up (NLU) from an electronic coupon displayed on a user's portable electronic device.

Figure 5A:
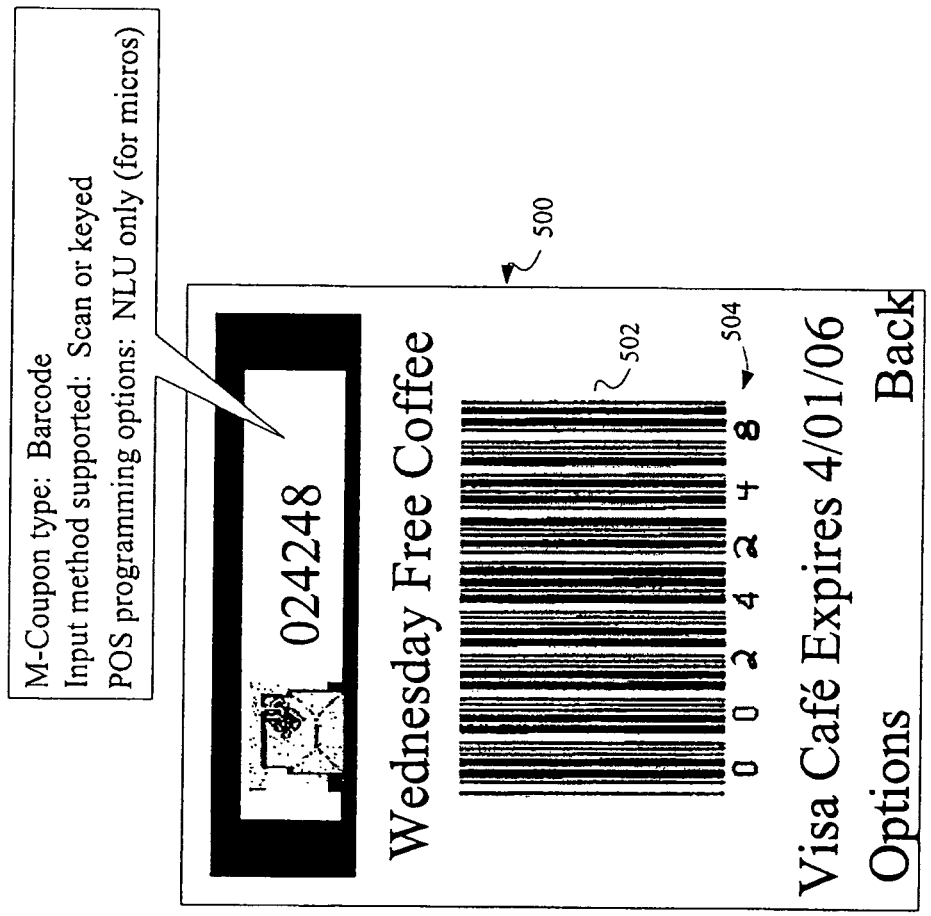
FIGS. 5(a)-5(c) show different screenshots on a phone. The screenshots include coupons.
Figure 5B:
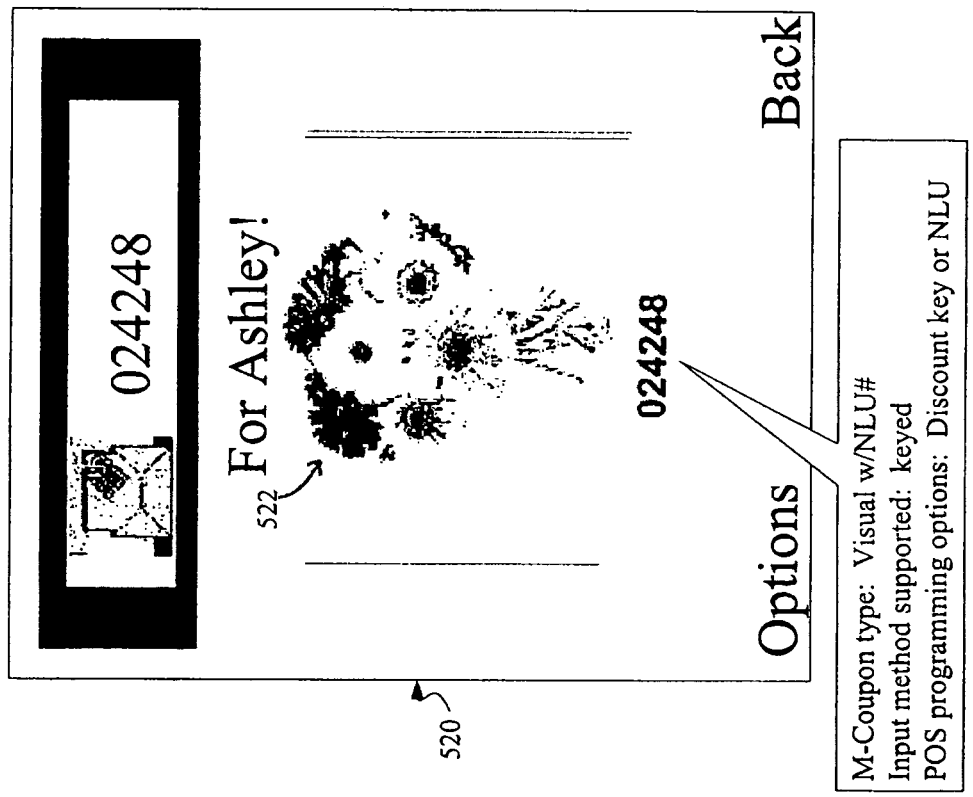
Figure 5C:
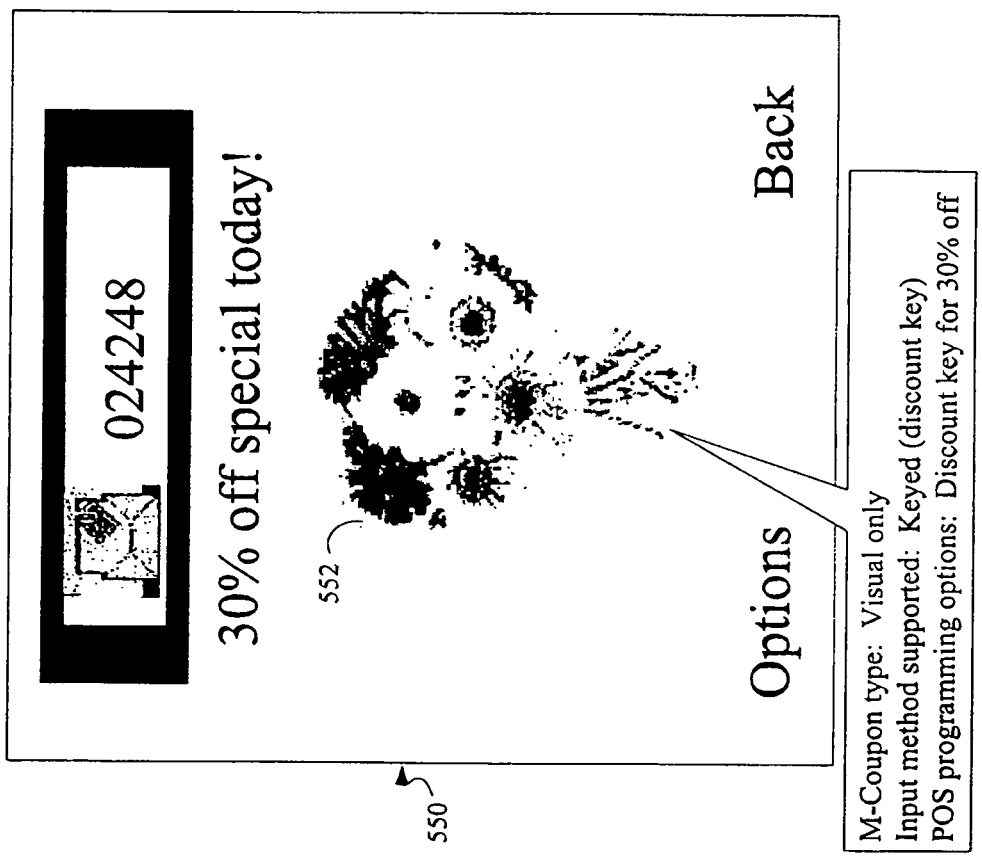

FIGS. 5A-5C are examples of three screenshots showing graphical coupons in different forms. These screenshots are configured to be able to be displayed on the small screen of a mobile phone, personal digital assistant (PDA), or other mobile device.

FIG. 5A shows a screenshot 500 which includes both a bar code 502 (which is an example of a machine readable code) and a seven digit number 504. The bar code 502 can be scanned with a scanner. One type of scanner which may be used to read a bar code on the screen of a cell phone is a charge coupled device (CCD) scanner. However, a laser-type scanner may not be able to read the bar code displayed due to reflection from the screen.

In order to process the electronic coupon shown in FIG. 5A, the user accesses and displays the coupon on the screen of his or her portable device. The cashier then accesses the discount screen shown in FIG. 4, and either scans the bar code in directly or enters the seven-digit number utilizing a numeric key pad.

FIG. 5B illustrates a screenshot 520 showing a different embodiment of a mobile electronic coupon in accordance with the present invention, which includes a visual display 522 and a personalized message 523. This visual display may be related to the nature of the coupon, representing for example the purchase of flowers. Alternatively, the display may simply illustrate the nature of the coupon, for example the display of flowers generically representing a gift.

Instead of a barcode, a six digit number "024248" is shown by the electronic coupon 520. In processing of coupon 520 by a cashier, this six digit number can be entered into a POS terminal to give the consumer a discount on a purchase. In accordance with one embodiment, the number can be entered by having the cashier type in the individual digits of the code on a numeric keypad. In accordance with an alternative embodiment, the number can be entered by having the cashier activate a predetermined key, or combination thereof, which allows recognition of the coupon and the discount.

The embodiment of FIG. 5B may offer certain advantages over a coupon employing a bar code as shown in FIG. 5A. One advantage is ease of operation, as there is no requirement for optical recognition/reading of a code from the screen of the phone. Another possible advantage is reduced cost of implementation, as a bar code scanner device is not required to be purchased or rented by the merchant. In addition, software and hardware upgrades relating to electronic scanning would not be required by this alternative embodiment.

Lastly, FIG. 5C shows a screenshot 550 showing a "30% off" coupon. This electronic coupon includes a visual display 552 but lacks either a bar code or an identifying number.

To use this coupon, the user shows the display to the cashier and the cashier selects a button on a POS terminal display (see FIG. 4) to provide the discount to the consumer. According to still further embodiments of the present invention, coupon information such as a code may be communicated to a portable device in a proprietary format.

Figure 7:
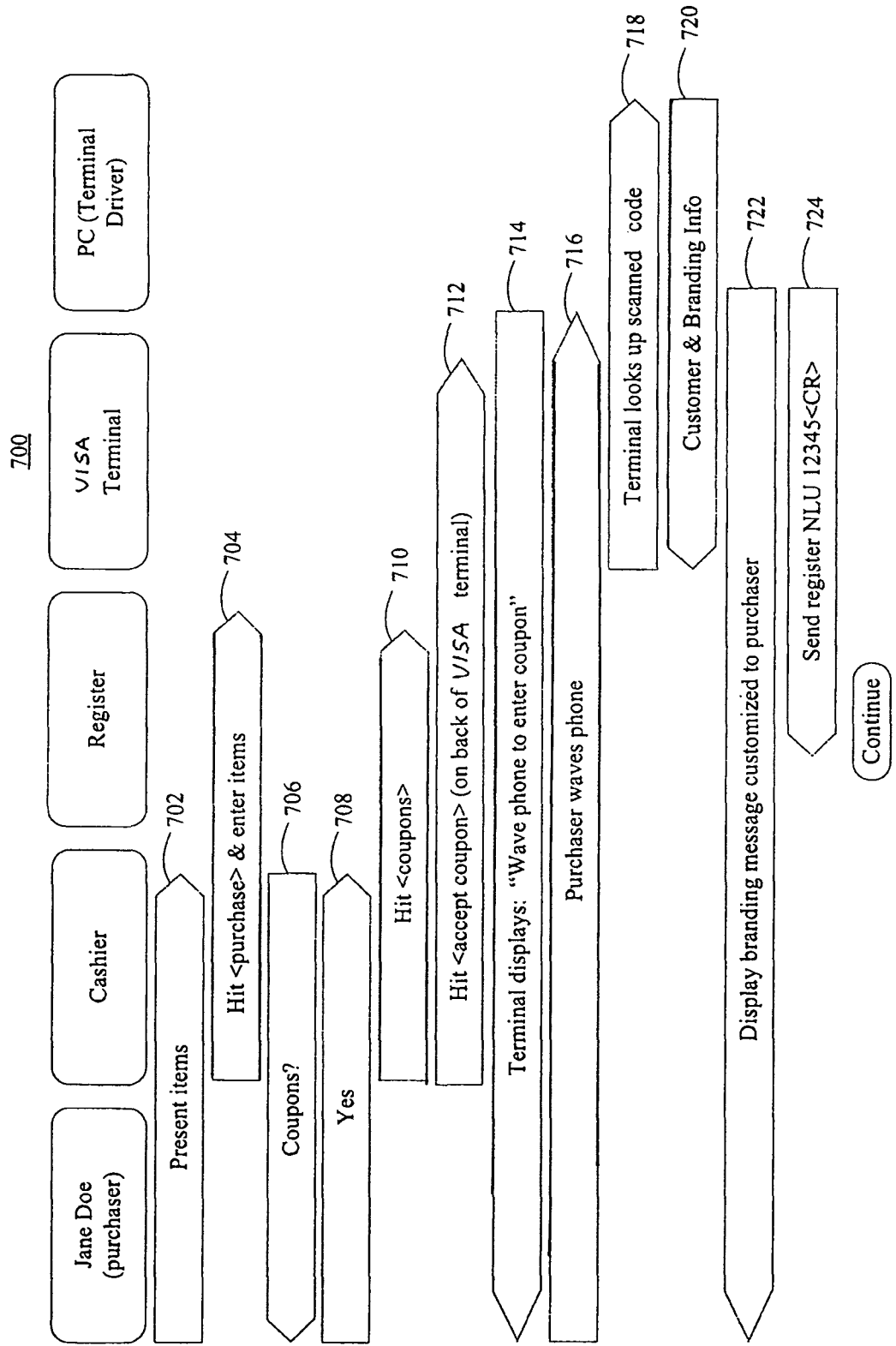
FIG. 7 shows a simplified flow of a process of utilizing an embodiment of an electronic coupon according to the present invention.

FIG. 7 shows a simplified flow of a process of utilizing a mobile coupon according to an embodiment of the present invention. In a first step 702 of process flow 700, a purchaser presents items to a cashier. In step 704, the cashier hits the purchase key and enters the items. In step 706, the coupon asks the purchaser whether or not she intends to use coupons. In step 708, the purchaser responds that she intends to use a coupon.

In step 710 of process flow 700, the cashier hits the coupons key to alert the register to the use of coupons. In step 712, the cashier hits the accept coupon button on the back of the VISA terminal.

In step 714, the VISA terminal displays a message requesting the purchaser to wave the phone to enter a coupon. In step 716, the purchaser waves the phone and the terminal receives the scanned code. In step 718 the processor in communication with the terminal looks up the scanned code. In step 720, the processor returns to the terminal, customer and branding information. In step 722, the terminal displays a branding message customized to the particular purchaser. Finally, in step 724, the terminal sends to the register a numeric look up representing the bar code.

A variation according to embodiments of the present invention may utilize near field communication of the coupon or a code therein, to the cashier. In this variation, a multi-digit numerical code (i.e. six digits) can be transmitted to the POS terminal via a reader using a contactless device such as the mobile device of FIG. 1A including an antenna. The coupon may be communicated in such a contactless manner using a short range communication method, such as a near field communications (NFC) capability. Examples of such NFC technologies include ISO standard 14443, RFID, Bluetooth™ and Infra-red communications methods. In accordance with such embodiments, the six digit code may or may not be shown on the display of the phone. Embodiments in accordance with the present invention are not limited to communicating coupon code information. In accordance with alternative embodiments, coupon information communicated from a mobile device to a POS terminal may include other information, for example a product code limiting applicability of the mobile coupon to a particular product, or an expiration date/time of the mobile coupon.

In certain embodiments, payment information (such as a credit card number, debit card number, home zip code of the card holder, or a three digit card verification value code) may be communicated from a mobile device in a contactless manner to the POS terminal. In such embodiments, the coupon information from the mobile device may also be communicated to the POS terminal in a contactless manner. In some embodiments, such communication of mobile coupon information may take place as part of the same message communicating payment information to the POS terminal. Alternatively, the coupon information may be communicated prior to, or following, contactless communication of the payment information to the POS terminal.

The consumer may receive a text message, a phone call, or e-mail indicating that the consumer has received a coupon. The consumer may then use his or her phone to transmit a code corresponding to the coupon, to a contactless reader coupled to a POS terminal. The near field communication can utilize, for example, infrared or an RF communication mode such as Bluetooth. The system shown in FIG. 1 can be used in conjunction with such an embodiment.

Returning to FIG. 2, apart from the mobile campaign server, a number of other elements are also under the control of entity 200. Notification module 250 is responsible for notifying participants in the program of particular events, for example limited time promotions or even the possibility of fraudulent transactions.

Mobile targeting module 260 is responsible for generating coupons targeted to a user. According to certain embodiments, the coupons can be targeted based upon a location based services (LBS) approach, utilizing prior purchasing activity by a consumer as detected over a payment processing network.

Specifically, where a payment transaction is conducted over a payment processing network, certain information is communicated that can be used for targeting of a mobile coupon. One piece of information that is potentially useful for targeting is the timing of the prior payment transaction.

In particular, the very existence of the prior purchase transaction reveals the consumer to be actively engaged in shopping rather than other activities (i.e. sleeping or working). Based upon this timing information, the consumer is known to likely be receptive to a mobile coupon for a subsequent transaction. Accordingly, embodiments of the present invention may thus generate and disseminate a mobile coupon to the consumer within a predetermined, limited time period from receiving an indication from the payment processing network that a prior payment transaction has occurred. Examples of time periods for dissemination of mobile coupons include, but are not limited to, one minute or less, five minutes, ten minutes, fifteen minutes, one-half hour, forty-five minutes, one hour, one and one half hours, two hours, three hours, four hours, and five hours or longer from the time that a prior purchasing activity is detected from the payment processing network. Such an approach allows for dissemination of a timely, non-intrusive mobile coupons to the consumer.

In certain embodiments, the duration of effectiveness of such a mobile coupon can also be limited by time. Such an embodiment would provide an incentive for the recipient to monitor his or her portable device for receipt of a mobile coupon, and use that coupon within the limited period that it is effective. Moreover, in certain embodiments, upon expiration the mobile coupon could be configured to automatically disappear from the consumer's portable device. This would reduce intrusiveness of the mobile coupon, as the consumer is not obligated to delete a backlog of expired coupons from his or her portable device.

Embodiments of the present invention are not limited to generating and promulgating mobile coupons based upon temporal information gleaned from a prior purchase transaction over a payment processing network. In accordance with alternative embodiments, the mobile coupons can be targeted based upon a geographic location of the user as determined from the payment processing network.

According to one embodiment, the location of the consumer can be determined from purchasing activity of the user based upon a Location Based Services (LBS) approach. For example, when the user swipes a card at a POS, an authorization message is returned from the payment network which includes a Merchant Identification Number (MID). The user's location at that time of sale can be determined from the MID number.

According to other embodiments, information regarding the nature of the prior purchase conducted over the payment processing network can be referenced to generate the coupon. Thus, a prior purchase of one product (for example a vacuum cleaner), could lead to generation of a second product (bags for the vacuum cleaner). This coupon generation could be irrespective of the time or physical location of a prior purchasing transaction. Still further alternatively, an LBS approach could be based upon the seller of the second product having an affinity agreement with the seller of the previous product purchased.

Moreover, a mobile coupon may be generated based upon more than one piece of information gleaned from a prior purchasing transaction conducted over a payment processing network. Specifically, the time, geographic location, and/or nature of the prior purchase transaction could be combined to generate the targeted coupon.

According to still other embodiments, information from a prior purchase transaction available from a payment processing network, may be combined with other information to generate a targeted coupon. For example, information regarding the location of the consumer can be determined from sources other than the payment processing network.

According to one approach, the location of a consumer can be determined by analyzing the location of the current base station through which the portable user device is transmitting and receiving information. Such current base station information is available from the telecommunications provider with which the consumer is affiliated, and in other applications is utilized to allow the user to contact the closest medical services provider in the case of a medical emergency. Thus, in certain embodiments, geographic information from this source could be combined with information (time, nature of prior purchases) available from the payment processing network, to generate a targeted coupon.

According to another approach, the location of a consumer can be determined by the use of Global Positioning System (GPS) technology. In this approach, the location of the portable device of the consumer is monitored utilizing a plurality of orbiting satellites. Thus, in other embodiments, geographic information from this source could be combined with information (time, nature of prior purchase) available from the payment processing network, to generate a targeted coupon.

Utilizing any of these approaches, or others, alone or in combination, the mobile targeting module 260 may send out a targeted mobile coupon to a consumer. For example, the mobile electronic coupon can be targeted in whole or in part based upon the recipient belonging to a particular group, such as an employee of a business or a member of a club.

Reward module 270 (such as "Visa Extras") is responsible for coordinating and administering an incentive or reward program that is tied to use of the payment network Thus a targeted mobile coupon may be generated and then electronically distributed to a portable consumer device as part of an incentive program. For example, the accrual of a certain volume of purchases utilizing a Visa card, may render the program participant eligible for a particularly valuable type of electronic coupon not typically available to other participants in the mobile coupon program. This targeted electronic coupon is then communicated to the consumer's mobile device for redemption.

Other elements indicated under the control of entity 200 in FIG. 2, may relate to the function of the payment network to execute purchase and payment transactions. Partners and banks 280 are outside of the control of entity 200 but interact therewith as part of the processing of payment transactions.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Figure 6:
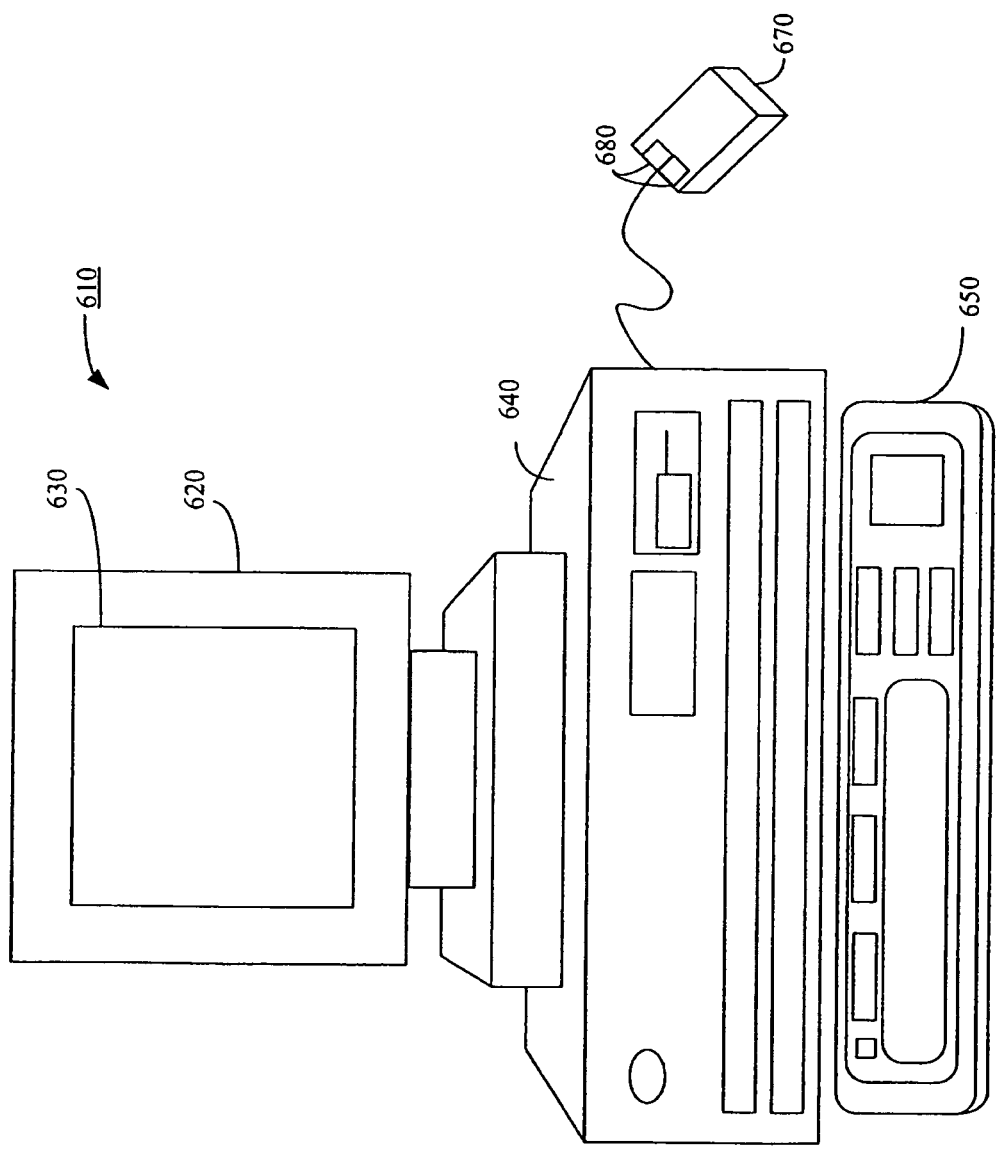
FIG. 6 is a schematic illustration of a computer system for use in accordance with embodiments of the present invention.

The various components of the mobile coupon system described above may be implemented with a computer system having various features. FIG. 6 shows an example of a generic computer system 610 including display device 620, display screen 630, cabinet 640, keyboard 650, and mouse 670. Mouse 670 and keyboard 650 are representative "user input devices." Mouse 670 includes buttons 680 for selection of buttons on a graphical user interface device. Other examples of user input devices are a touch screen, light pen, track ball, data glove, microphone, and so forth. FIG. 6 is representative of but one type of system for embodying the present invention. It will be readily apparent to one of ordinary skill in the art that many system types and configurations are suitable for use in conjunction with the present invention. In a preferred embodiment, computer system 610 includes a Pentium class based computer, running Windows NT operating system by Microsoft Corporation. However, the apparatus is easily adapted to other operating systems and architectures by those of ordinary skill in the art without departing from the scope of the present invention.

As noted, mouse 670 can have one or more buttons such as buttons 680. Cabinet 640 houses familiar computer components such as disk drives, a processor, storage device, etc. Storage devices include, but are not limited to, disk drives, magnetic tape, solid state memory, bubble memory, etc. Cabinet 640 can include additional hardware such as input/output (I/O) interface cards for connecting computer system 610 to external devices external storage, other computers or additional peripherals, further described below.

Figure 6A:
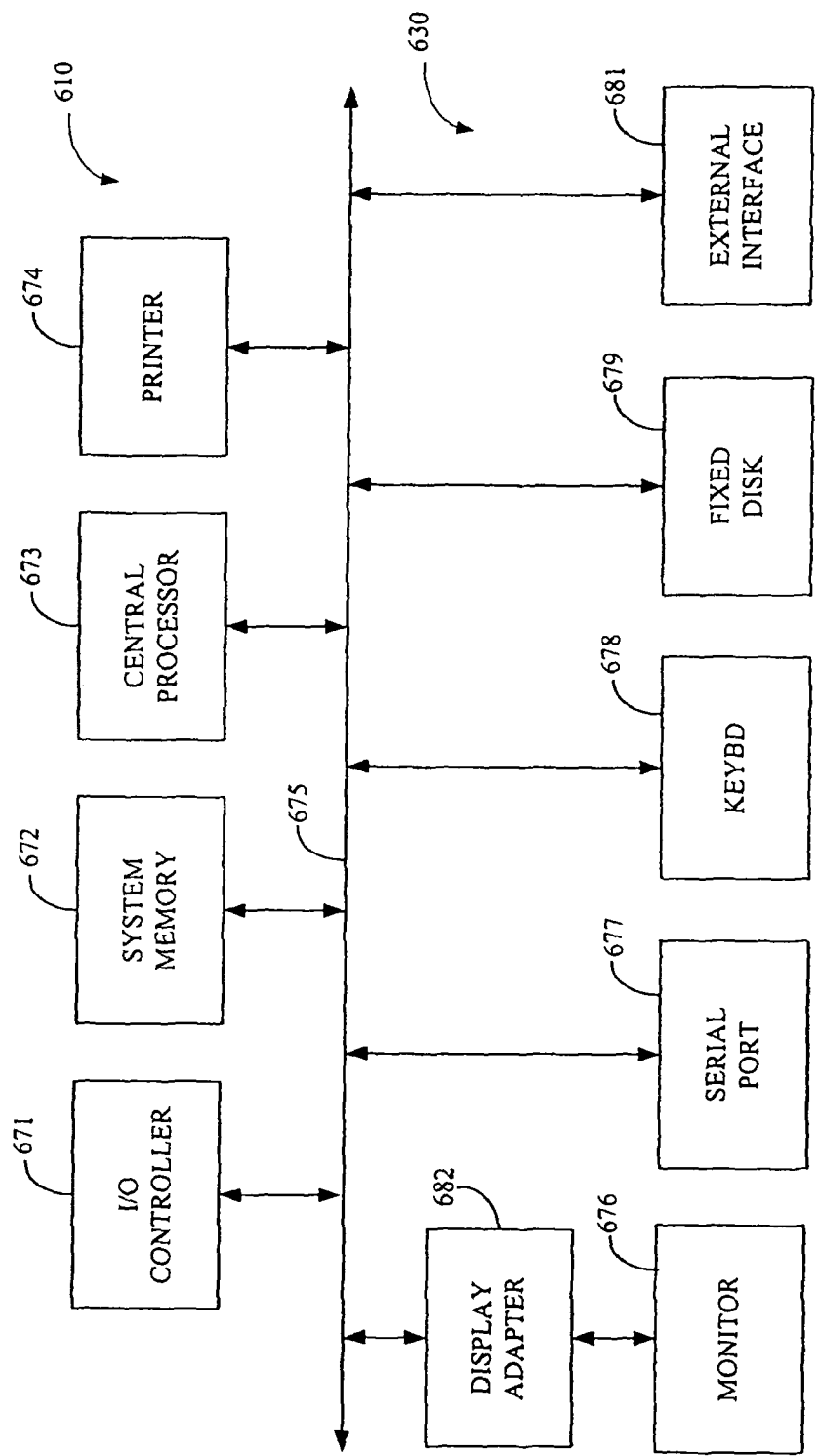
FIG. 6A is an illustration of basic subsystems the computer system of FIG. 6.

FIG. 6A is an illustration of basic subsystems in computer system 610 of FIG. 6. This diagram is merely an illustration and should not limit the scope of the claims herein. One of ordinary skill in the art will recognize other variations, modifications, and alternatives. In certain embodiments, the subsystems are interconnected via a system bus 675. Additional subsystems such as a printer 674, keyboard 678, fixed disk 679, monitor 676, which is coupled to display adapter 682, and others are shown. Peripherals and input/output (I/O) devices, which couple to I/O controller 671, can be connected to the computer system by any number of means known in the art, such as serial port 677. For example, serial port 677 can be used to connect the computer system to a modem 681, which in turn connects to a wide area network such as the Internet, a mouse input device, or a scanner. The interconnection via system bus allows central processor 673 to communicate with each subsystem and to control the execution of instructions from system memory 672 or the fixed disk 679, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
    detecting, by a server computer associated with a payment processing network located between an issuer and an acquirer, purchase activity associated with an individual consumer using an account at the issuer, the payment processing network configured to process credit card and debit card transactions;
    storing, by the server computer associated with the payment processing network, the purchase activity as consumer transaction data associated with the individual consumer;
    referencing, by the server computer associated with the payment processing network, the consumer transaction data associated with the individual consumer stored as part of the payment processing network to generate an electronic coupon targeted to the individual consumer;
    determining, by the server computer associated with the payment processing network, from the consumer transaction data associated with the individual consumer stored as part of the payment processing network, a location of a prior transaction conducted by the individual consumer over the payment processing network;
    determining, by the server computer associated with the payment processing network, from the consumer transaction data associated with the individual consumer stored as part of the payment processing network, a time of the prior transaction conducted by the individual consumer over the payment processing network;
    generating by the server computer associated with the payment processing network, an electronic coupon based on the location of the prior transaction and within a predetermined time of less than one hour from the time of the prior transaction conducted over the payment processing network, wherein the electronic coupon includes a bar code configured to be electronically scanned from a display of a mobile device of the individual consumer for redemption of the electronic coupon;
    transmitting by the server computer associated with the payment processing network, the electronic coupon within the predetermined time of less than one hour from the time of the prior transaction conducted over the payment processing network, to the mobile device of the individual consumer over a communications network; and
    processing, using the server computer associated with the payment processing network, a purchase transaction utilizing the electronic coupon over the payment processing network.

2. The method of claim 1 further comprising determining the location of the prior transaction from a location based services (LBS) approach based upon the prior transaction conducted over the payment processing network.

3. The method of claim 2 further comprising determining the location of the prior transaction from a merchant identification number in the prior transaction.

4. The method of claim 1 further comprising determining a geographic location of the individual consumer from a global positioning system (GPS) element in the mobile device.

5. The method of claim 1 further comprising determining a geographic location of the individual consumer from the mobile device communicating through the communications network.

6. The method of claim 1 wherein the electronic coupon is transmitted in encrypted form.

7. The method of claim 1 further comprising:
receiving the electronic coupon from a point of sale at a merchant associated with the acquirer.

8. The method of claim 1 wherein the consumer transaction data includes information submitted by the individual consumer.

9. The method of claim 1 wherein the electronic coupon is transmitted in the form of a short messaging service (SMS) message, a SMS link, a multimedia messaging service (MMS) message, or an e-mail message.

10. The method of claim 1 further comprising confirming receipt of the electronic coupon by the individual consumer.

11. The method of claim 1 further comprising transmitting a message to the individual consumer indicating that the individual consumer has received a coupon.

12. The method of claim 1 wherein the electronic coupon is limited by time and upon expiration of that time, the electronic coupon automatically disappears from the mobile device.

13. The method of claim 1 further comprising receiving a code from the mobile device during the purchase transaction before processing the purchase transaction over the payment processing network.

14. The method of claim 1 further comprising:
determining, from the consumer transaction data associated with the individual consumer stored as part of a payment processing network, a particular product that was purchased in the prior transaction; and
generating the electronic coupon based on the particular product.

15. The method of claim 1 wherein detecting purchase activity associated with an individual consumer comprises receiving an authorization request message for the purchasing activity.

16. The method of claim 1 wherein detecting purchase activity associated with an individual consumer comprises receiving an authorization response message for the purchasing activity indicating whether the purchasing activity is authorized by the issuer.

17. The method of claim 1 wherein the predetermined time is less than fifteen minutes.

18. A server for a mobile coupon program, the server comprising:
a processor; and
a computer readable storage medium in electronic communication with the processor, the computer readable storage medium having stored thereon, program code, when executed, that causes the processor to perform the steps of:
detecting purchase activity associated with an individual consumer and using an account at an issuer;
storing the purchase activity as consumer transaction data associated with the individual consumer;
referencing the consumer transaction data associated with an individual consumer stored as part of a payment processing network to generate an electronic coupon targeted to the individual consumer, the payment processing network configured to process credit card and debit card transactions and being located between an acquirer and the issuer,
determining, from the consumer transaction data associated with the individual consumer stored as part of the payment processing network, a location of a prior transaction conducted by the individual consumer over the payment processing network;
determining, from the consumer transaction data associated with the individual consumer stored as part of the payment processing network, a time of a prior transaction conducted by the individual consumer over the payment processing network,
generating an electronic coupon, based on the location of the prior transaction and within a predetermined time of less than one hour from the time of the prior transaction conducted over the payment processing network, wherein the electronic coupon includes a bar code configured to be electronically scanned from a display of a mobile device of the individual consumer for redemption of the electronic coupon; and
transmitting the electronic coupon within the predetermined time of less than one hour from the time of the prior transaction conducted over the payment processing network, to the mobile device of the individual consumer over a communications network.

19. The server of claim 18 wherein the steps further include generating the electronic coupon based upon a geographic location of the individual consumer.

20. The server of claim 19 wherein the steps further include determining the geographic location of the individual consumer from a location based services (LBS) approach based upon the prior transaction conducted over the payment processing network.

21. The server of claim 19 wherein the steps further include determining the geographic location of the consumer from a merchant identification number in the prior transaction.

22. The server of claim 19 wherein the steps further include determining the geographic location of the individual consumer from a global positioning system (GPS) element in the mobile device.

23. The server of claim 19 wherein the steps further include determining the geographic location of the individual consumer from the mobile device communicating through the communications network.

24. A method comprising:
receiving, at a server computer associated with a payment processing network located between an issuer and an acquirer, and being configured to process credit card and debit card transactions, an authorization request message for a first purchasing transaction using an account at the issuer and conducted over the payment processing network;
storing, by the server computer, consumer transaction data associated with the first purchasing transaction;
determining, by the server computer, a location of the first purchasing transaction conducted over the payment processing network;
determining, by the server computer, a time of the first purchasing transaction conducted over the payment processing network;
generating, by the server computer, an electronic coupon targeted to the consumer based on the location of the first purchasing transaction and within a predetermined time of less than one hour from the time of the first purchasing transaction conducted over the payment processing network, wherein the electronic coupon includes a bar code configured to be electronically scanned from a display of a mobile device of the consumer for redemption of the electronic coupon;
transmitting, by the server computer, the electronic coupon within the predetermined time of less than one hour from the time of the first purchasing transaction to the mobile device of the consumer; and
processing, by the server computer, a second purchasing transaction over the payment processing network, the second purchasing transaction involving use of the electronic coupon to obtain a discount.

25. The method of claim 24 wherein the first purchasing transaction or the second purchasing transaction allow the consumer to receive an award.

26. The method of claim 24 further comprising receiving enrollment information from the consumer to enroll in an electronic coupon program before receiving the authorization request message.

27. The method of claim 24 wherein the authorization request message is a first authorization request message and wherein the second purchasing transaction uses a second authorization request message comprising the electronic coupon, the first and second authorization request messages originating using the same payment card, which is associated with the issuer.

* * * * *